UNITED STATES PATENT OFFICE.

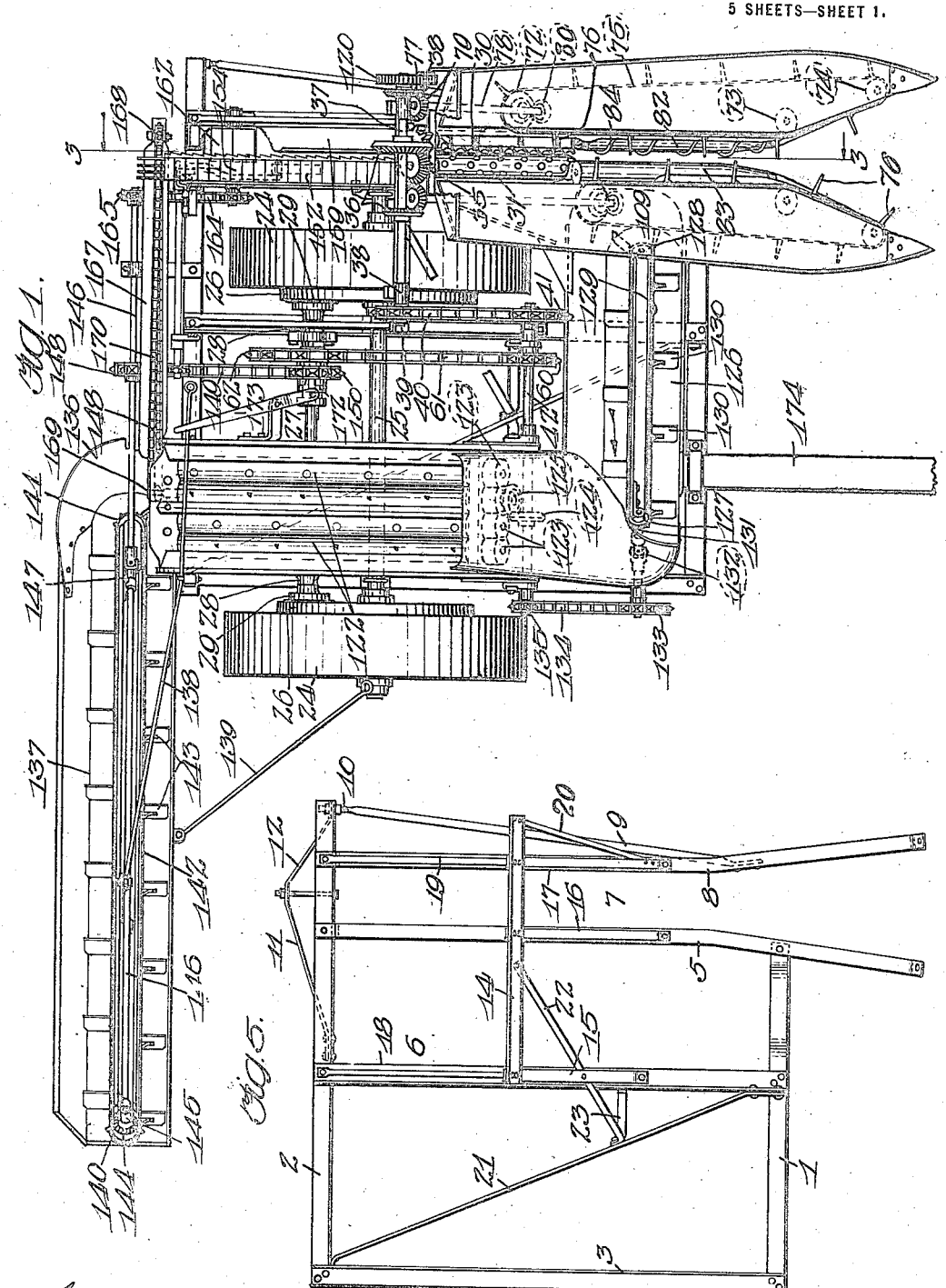

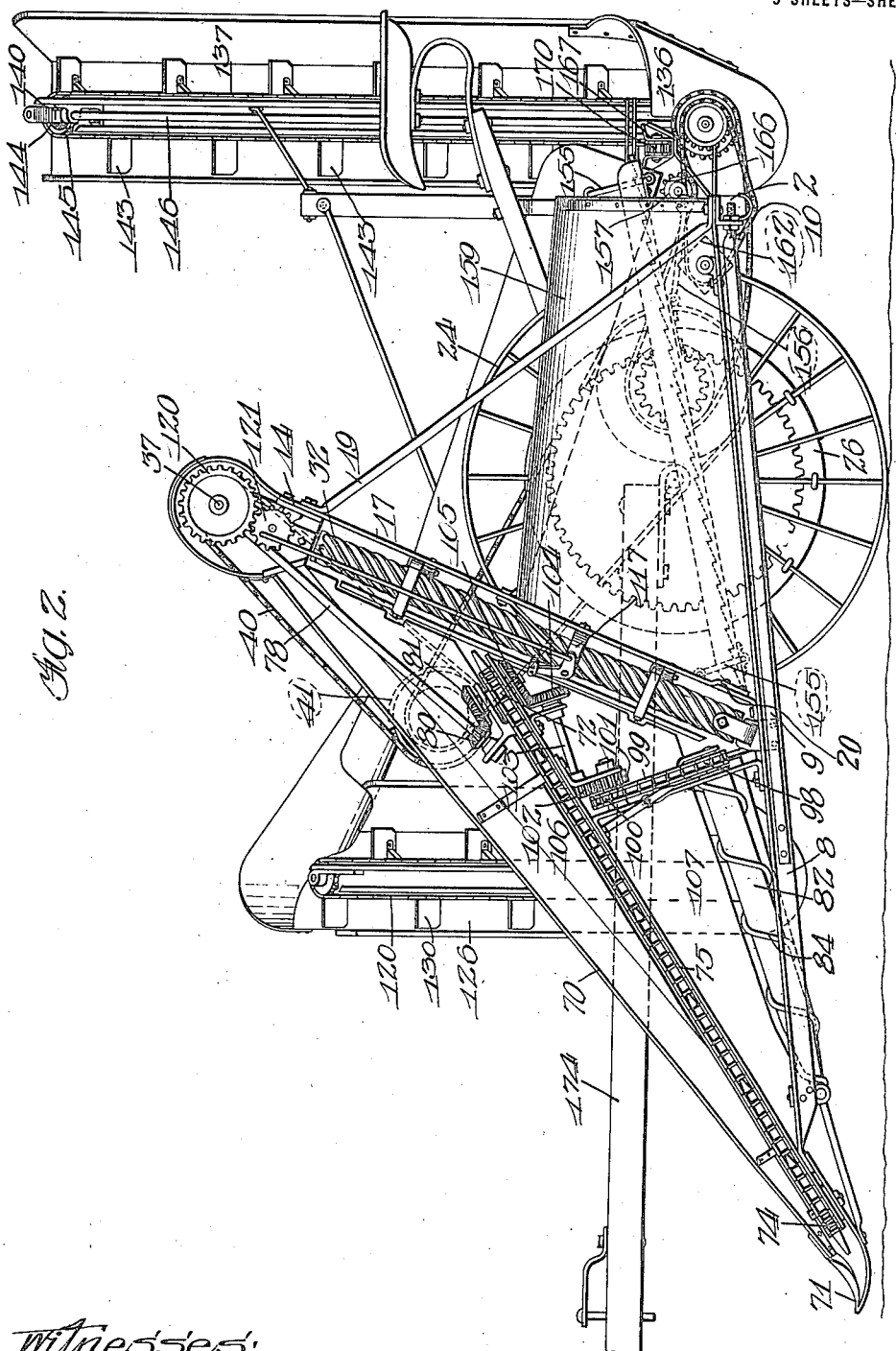

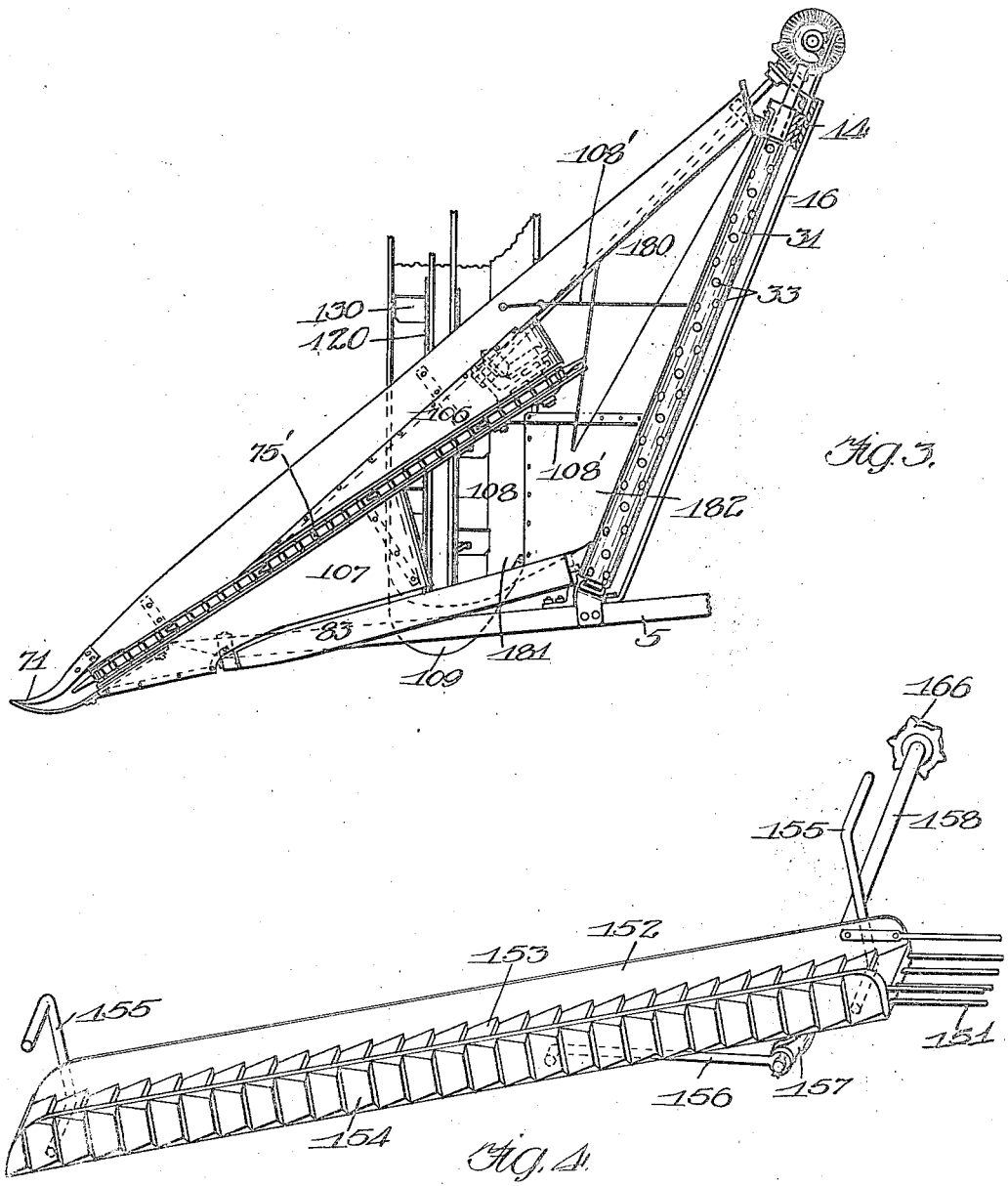

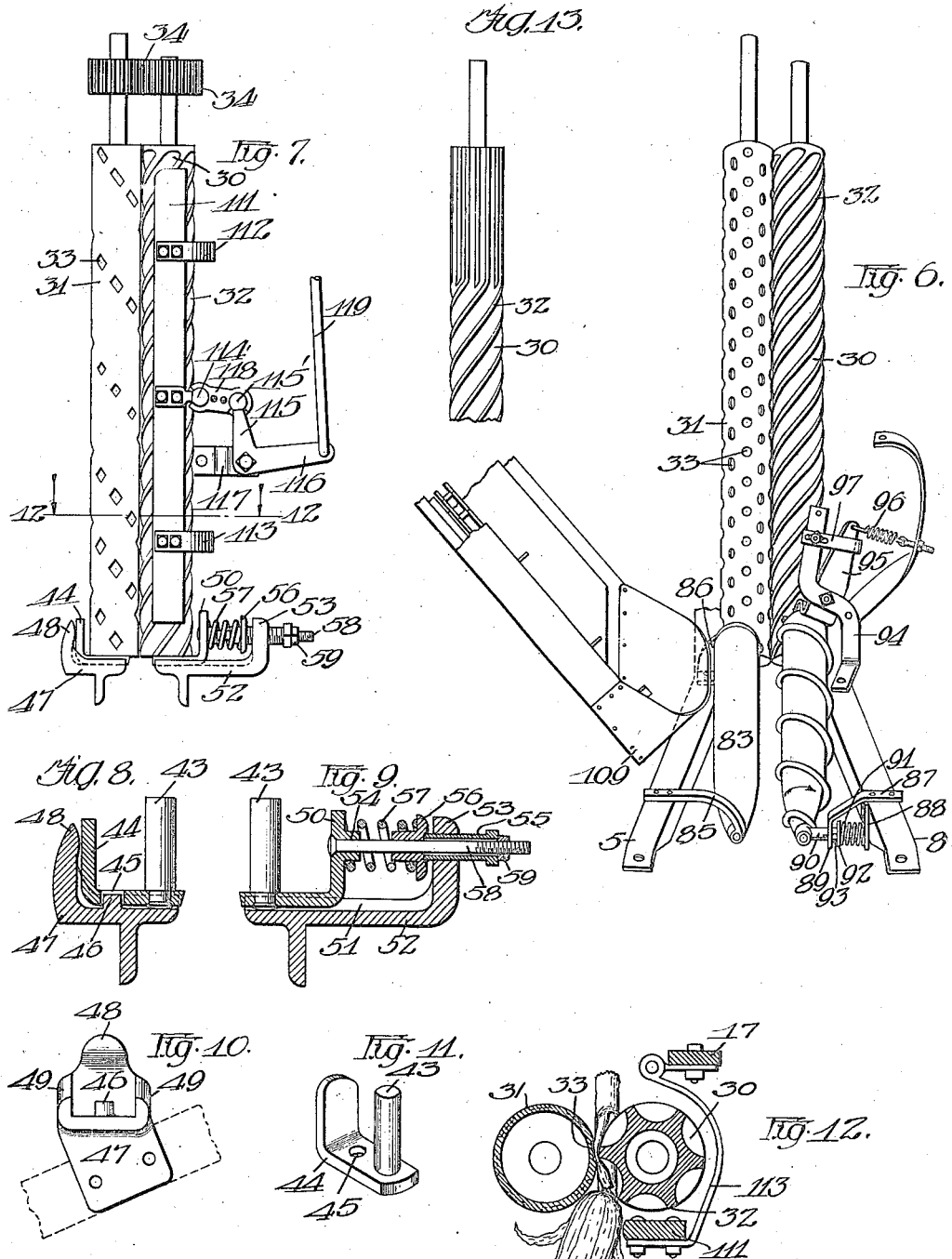

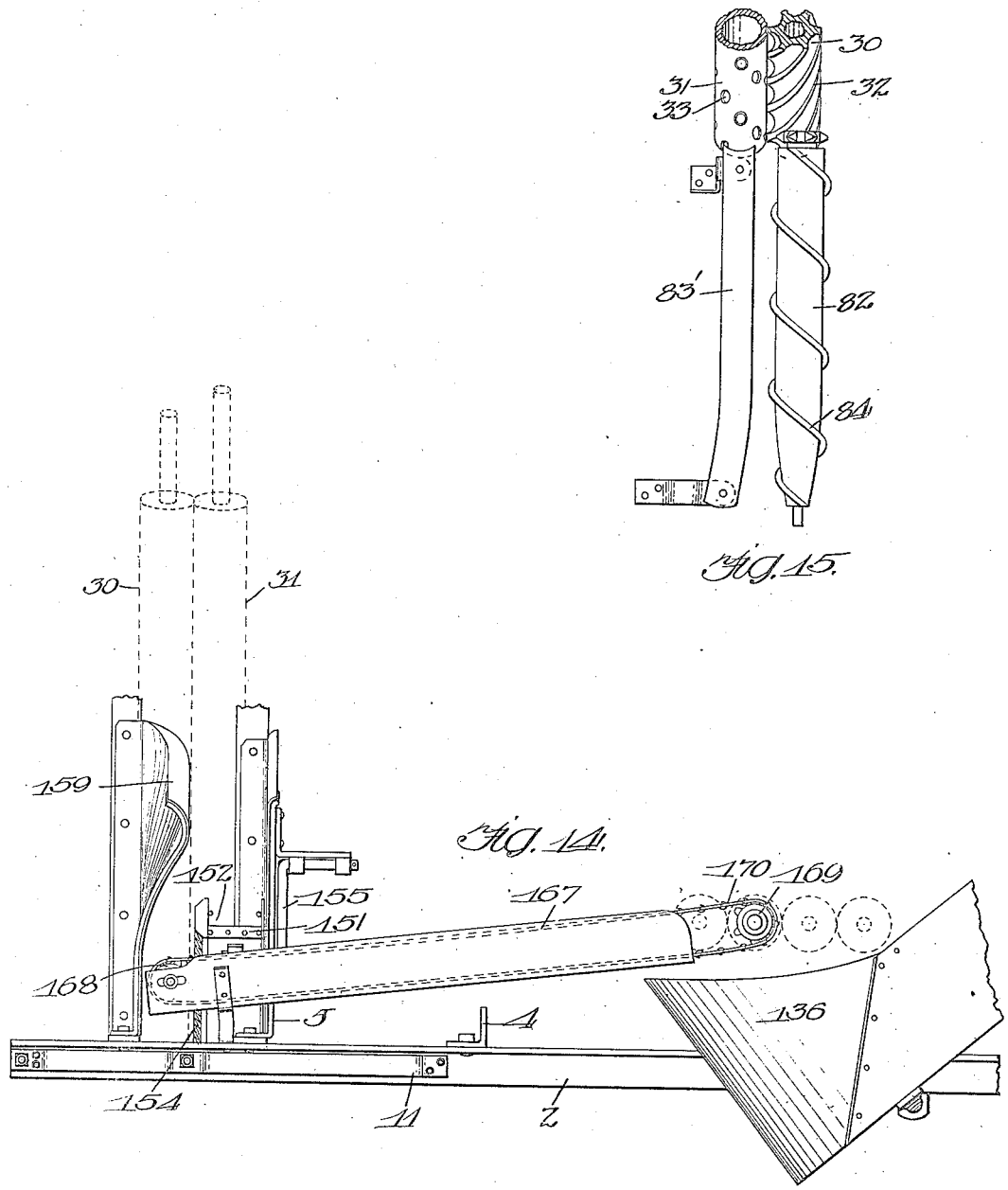

CHARLES H. TAYLOR, OF JOLIET, ILLINOIS.

CORN-HARVESTING MACHINE.

1,159,548.

Specification of Letters Patent.

Patented Nov. 9, 1915.

Application filed April 8, 1908. Serial No. 425,877.

*To all whom it may concern:*

Be it known that I, CHARLES H. TAYLOR, a citizen of the United States, residing at Joliet, in the county of Will and State of Illinois, have invented certain new and useful Improvements in Corn-Harvesting Machines, of which the following is a description.

My invention relates to that general class of devices known as harvesters, and to that particular class of harvesters adapted to be used in the field for separating the ears from the standing stalks and also in the preferred construction for removing the husks from the ears before the ears are discharged from the machine.

The object of my invention is to produce a convenient, efficient, and thoroughly reliable device of the kind described and one that is adapted to thoroughly clean the field with the least possible amount of damage to the standing stalks and ear corn and the least possible waste from shelling or other cause.

To this end my invention consists in the novel construction, arrangement, and combination of parts herein shown and described, and more particularly pointed out in the claims.

In the accompanying drawings wherein like or similar reference characters indicate like or corresponding parts; Figure 1 is a plan view of my device. Fig. 2 is a side elevation of the same. Fig. 3 is a section taken substantially on line 3—3 of Fig. 1, with all that portion of the machine back of the snapping rolls broken away. Fig. 4 is an enlarged perspective detail of the shelled corn receiver and stalk agitator. Fig. 5 is a plan view of the main frame of my machine. Fig. 6 is an enlarged front view of the snapping rolls and gathering reels detached from the machine and shown in their proper operating relation to each other. Fig. 7 is a front view of the snapping rolls and beater detached from the remainder of the machine to more clearly show their construction. Figs. 8 and 9 are sectional views of the lower snapping roll supporting members. Fig. 10 is a detail of the bracket for supporting the lower ends of the snapping rolls. Fig. 11 is a perspective detail of the bearing shaft and arm shown in Fig. 8. Fig. 12 is a section taken substantially on line 12—12 of Fig. 7. Fig. 13 is a detail of a portion of a slightly modified form of snapping roll for my device. Fig. 14 is a partial rear elevation of my device with parts removed and broken away to more clearly show the construction. Fig. 15 is a detail of a slightly modified form of gathering mechanism.

In the form shown in the drawings, my device consists of a suitable frame, mounted upon any desired number of supporting wheels, adapted to support the various coöperating parts of my device in their proper operative relation to each other so as to successively operate upon each stalk of corn encountered by the machine when in operation and the ears after being detached from the stalks, and means for attaching horses to the machine or otherwise propelling the same about a field when in operation to bring the machine into operative contact with the standing corn.

As shown the main frame of my device consists of a pair of substantially parallel bars 1 and 2 positioned at the front and rear of the frame respectively and connected by the longitudinal beams 3, 4 and 5 forming a substantially rectangular inclosure 6 divided longitudinally by the beam 4. A stalk-way 7 is formed at one side of the inclosure 6 between the beam 5 and a beam 8 attached at one end to the bar 2 and preferably diverging slightly from the beam 5 toward the front of the machine. For this purpose the bar 2 is extended beyond the side of the inclosure 6 sufficiently to receive the end of the beam 8 and also preferably sufficiently to receive one end of a brace-rod 9 arranged to assist in controlling the free end of the beam 8. The brace-rod 9 may be attached to the bar 2 and beam 8 in any desired manner. In the form shown the brace 9 is riveted or otherwise permanently and rigidly secured to the beam 8 near its front end and at its opposite end is provided with a threaded portion 10 provided with suitable nuts arranged to receive a portion of the bar 2 between them so that the effective length of the brace-rod 9 may be adjusted to control the position of the free end of the beam 8. In the preferred form also, a brace or truss-rod 11 is provided upon the bar 2 with a tie-rod 12 positioned substantially at the center of the stalk-way 7 and arranged to operate to prevent the possible deflection of the bar 2 at the stalk-way. In the preferred construction also, a transverse beam 14 is provided intermediate the ends of, and suitably spaced from, the beams 5 and 8 and connected thereto and also to the beam 4 by means of uprights 15, 16 and 17 extending from the bar 14 to the beams 4, 5 and 8 respectively to assist in maintaining the free end of the beam 8 in position. Suitable brace-rods 18 and 19 are provided extending from the beam 14 toward the bar 2, also a brace-rod 20 connecting the extended end of the beam 14 to the lower end of the upright 17, thus tending to rigidly maintain the several parts in position.

If preferred a diagonal brace-rod 21 may be provided between the bar 2 and beam 4 as shown, to prevent distortion of this portion of the frame and when so constructed a diagonal brace-rod 22 is preferably provided extending from the beam 14 to the brace-rod 21 and rigidly attached near its center to the upright 15. A short brace 23 is also preferably provided extending from the junction of the braces 21 and 22 to the beam 4, thus providing an extremely stiff and rigid structure upon which to mount the various operating portions of my device.

In the form shown two supporting wheels 24—24 are provided for my device, each rotatably mounted upon a suitable shaft 25 rigidly attached to the beams 3, 4 and 5 of the frame in any suitable manner. Each of the supporting wheels 24 is provided with a suitable gear 26 or equivalent means secured to its inner side. A shaft 27 is rotatably mounted in suitable bearings 28—28 upon the frame of the machine, and provided with a pinion 29 attached in the usual or any preferred manner at each of its extremities, each arranged to coöperate with one of the gears 26 to rotate the shaft 27. Thus when the machine is in motion, the rotation of the wheels 24 provide the necessary power for operating the various parts of the mechanism mounted upon the frame.

Any suitable means may be provided for operating upon the stalks to remove the ears therefrom. In the form shown, a pair of snapping rolls 30—31 are mounted in the stalk-way 7 with their lower ends rotatably supported upon the beams 5 and 8 respectively, and extending upward and rearward toward the beam 14 upon which suitable bearings are provided to support their upper ends. The snapping rolls may be of the usual or any preferred construction. As shown the snapping roll 30 is provided with a plurality of spiral projections 32 of substantially uniform height upon its periphery, and the roll 31 is provided with any desired number or arrangement of recesses, or counter-sinks 33 so positioned that as the rolls are rotated each recess 33 will coöperate with the periphery of a spiral projection 32 and provide a suitable biting surface to engage a stalk or ear-stem, between the rolls to prevent its slipping, while the butt of the ear about to be snapped from the stalk is engaged by the smooth cylindrical portion of the roll. The spiral projection 32 whether continuous or consisting of a series of short sections is preferably so formed that when the rolls are operated, the stalks which usually tend to arrange themselves between the projections, will be moved toward the upper, or rear, ends of the rolls thus greatly aiding in the regular movement of the stalks through the machine. A roller therefore having longitudinal projections or corrugations that is, corrugations extending parallel to the axis of the roll, while giving excellent results as to the removal of the ears from the stalks, does not apparently tend to feed the stalks along the rolls, for the same reason a snapping roll having a portion of its length, say the lower or forward half, provided with spiral projections and the remainder with longitudinal projections or corrugations, as shown in Fig. 13 is not believed to operate so satisfactorily as where the spiral projections extend along the entire face of the roll. These forms therefore when used in combination with a smooth faced roller having depressions or counter-sinks as described operate in a very satisfactory manner and are believed to be a decided advance in the art, but the form first described and shown is believed to be preferred and much more desirable in operation.

Any suitable means may be provided for rotating the snapping rolls so as to preserve their proper coöperative relation with each other as above described. In the form shown, a spur-gear 34 (see Fig. 7) is provided at the upper end of each of the rolls and rigidly secured thereto. The shaft for the roll 31 is preferably extended sufficiently beyond the spur-gear 34 to receive a bevel-gear 35 arranged to coöperate with a bevel-gear 36 mounted upon a transverse shaft 37. The shaft 37 is mounted in suitable bearings 38—38 attached to the bar 14 and provided with a sprocket-wheel 39 at one end connected by means of a chain 40 to a sprocket-wheel 41 mounted upon a suitable counter shaft 42. The shaft 42 may be rotated in any suitable manner. As shown a sprocket-wheel 60 is rigidly secured to the shaft 42 and rotatably connected by a chain 61 to a sprocket-wheel 62 upon the shaft 27.

The lower ends of the snapping rolls may be supported in position in any desired manner. In the form shown, each roller is provided at its lower end with a bearing formed upon its interior. A non-rotatable stud or shaft 43 is provided to rotatably fit within this bearing to support the extremity of the roll in position. In the form shown the stud 43 coöperating with the roller 31 is provided with an arm 44 rigidly attached to its lower end, and extending first laterally and then toward the opposite end of the stud. The arm 44 is preferably provided with an opening 45 or other suitable means in its lateral portion adapted to coöperate with a lug 46 upon a suitable supporting bracket 47 to loosely retain the arm in position upon the bracket. The bracket 47 may be of any desired form adapted to support the lower end of the roller and is preferably secured to the bar 5 and provided with a part 48 extending upward to a point substantially opposite the center of the bearing formed in the end of the roll, and there provided with means for engaging the arm 44 to control the transverse position of the bearing in one direction and receive the lateral pressure due to the material between the rolls, the movement of the parts in the opposite direction being prevented by the engagement of the lug 46 in the opening 45 or other suitable means. In the preferred construction a rib 49 is provided upon each side of the bracket 47 adapted to engage the opposite sides of the arm 44 to prevent its rotation and partially control the lateral position of the lower end of the shaft or stud 43.

The roll 30 is preferably provided with resilient means for controlling the position of its lower extremity in the common plane of the rolls. For this purpose the shaft or stud 43 for the roll 30 is provided with an arm 50 substantially the same as the arm 44 with a lateral portion of approximately uniform width arranged to loosely fit and freely slide in a longitudinal slot or recess formed in the face of a bracket 52 for supporting this portion of the device upon the beam 8. As shown the bracket 52 is provided with a part 53 extending to a position substantially opposite the central portion of the bearing in the extremity of the roll 30 and adapted to be connected to the arm 50 to control the position of the lower end of the roller.

The connecting means between the part 53 and arm 50 may be of any suitable form or construction to provide the desired adjustment. In the form shown a lug 54 is provided upon the arm 50 substantially opposite the center of the bearing upon the stud 43 and a set-screw 55 is provided upon the part 53 with a loose cap or sleeve 56 at its inner end. A spring 57 is mounted between the lug 54 and the part 56 to resiliently force the arm 50 and its associated parts away from the part 53 of the bracket 52. In the preferred construction the set-screw 55 is tubular and a rod 58 is provided, extending centrally through the lug 54, the cap 56, and screw 55 to the outer end of the screw where it is provided with a nut 59 or other suitable means for adjusting and limiting the distance between the arm 50 and the part 53. It will thus be seen as above described the lower end of the roller 30 is resiliently held against movement in one direction, and rigidly held from movement in the opposite direction, so that the roller 30 may resiliently adjust itself to the amount of material between the rolls but is rigidly prevented from approaching too closely to the other roll when there is no material between them.

Any suitable means may be provided for directing the stalks to the snapping rolls. In the form shown a pair of dividers, and a pair of gathering reels are provided for this purpose. The dividers may be of any desired form or construction adapted to extend on each side of a row of corn and engage, and lift, any broken or prostrate stalks and support and direct the same together with the standing corn to the snapping rolls. As shown each divider consists of a plate 70 secured at its lower end to the free end of the beams 5 or 8 of the frame, as the case may be, and extending upwardly and rearwardly toward the beam 14. The lower extremity of each divider is preferably provided with a shoe 71 or other suitable means adapted to pass beneath and raise any prostrate stalks and to pass in suitably close proximity to the surface of the field upon which the device is operated. The front ends of these plates are preferably widely divergent from each other so that the device will engage the stalks between them in case the machine is not directed exactly upon the row or where the rows are irregular or the stalks otherwise considerably separated.

Suitable means are preferably provided along the inner edge of each of the dividers to engage the stalks between the dividers and carry or feed them toward the snapping rolls. In the form shown a plurality of sprocket or guide wheels 72, 73 and 74 are provided for each divider and positioned below the plate 70 so that a sprocket chain 75 connecting the several wheels as shown will, at the inner side of the plate 70 substantially follow the outline of the plate. The sprocket chain 75 is provided with any desired number of fingers or projections 76 adapted to engage the stalks that contact with the inner edge of the plate and carry the same rearwardly of the machine toward the snapping rolls when the sprocket wheels are rotated to operate the chain.

Any suitable means may be employed to rotate the sprocket wheels to operate the chain. As shown a bevel gear 77 is mounted upon the shaft 37 for each divider, and a shaft 78 provided with a bevel gear 79 upon its upper end, adapted to coöperate with the gear 77, is rotatably mounted in suitable bearings upon the machine in position for the gears 77 and 79 to properly mesh to drive the shaft 78. A beveled pinion 80 is mounted at the lower end of the shaft 78 and arranged to coöperate with a beveled gear 81 rigidly connected to the sprocket wheel 77. The sprocket or other suitable carrying wheels 73 and 74 merely operate as idlers to direct the chain 75 along the inner edge of the plate 70.

The gathering reels 82, 83 are each preferably cylindrical rollers tapering at their front end, rotatably mounted upon the beams 8 and 5 respectively. The reel 82 is preferably provided with a projecting spiral flange 84 upon its periphery, adapted, when the reel is rotated, to engage the stalks positioned between the reels and carry them toward the snapping rolls. The gathering reels are preferably rotated to move their proximate surfaces upward and are so positioned in relation to each other horizontally that an ear of corn of normal size will not pass between the reels but will be carried rearward by the spiral projection 84 until it escapes over the reel 83. The rear portion of the reel 83 is preferably positioned considerably lower than the corresponding portion of the reel 82 to insure the discharge of the ears in this manner.

When arranged as above described there is sufficient space between the reels to avoid sufficient engagement with the stalks to uproot them, while any ears partially detached, or for any other reason positioned so low upon the stalks that they would pass below the snapping rolls and be lost will be engaged between the forward end of the gathering reels and lifted above them, after which they may be carried along the reels until discharged as above described. The gathering reels are also conveniently positioned to prevent the loss of any ears detached by the snapping rolls and which might otherwise drop outside the receptacle provided to receive them.

In the form shown in Fig. 15 a stationary member 83′ is provided in place of the reel 83 the operation being in general substantially as before described, except that very low ears engaged between the reel 82 and member 83′ are not raised quite as efficiently as in the form before described, while ears resting jointly upon the reel 82 and member 83′ are discharged into a receptacle or other device slightly more satisfactorily than in the previously described form. In the preferred construction the reel 83 is mounted upon suitably formed rigid bracket bearings 85 and 86 attached to the beam 5, arranged to prevent any lateral movement of the reel. The reel 82 on the other hand is mounted in movable bearings at each ends so that the lateral position of this reel may be automatically adjusted to suit the amount of material between the reels. Any suitable form of resiliently adjustable bearings may be employed for this purpose. In the form shown the bearing for the forward end of the reel consists of a bracket 87 with two downwardly projecting arms 88—89 suitably spaced from each other. A suitable opening is formed in each arm to receive a plunger 90. The space between the arms 88 and 89 is sufficient to receive a spring 91 preferably coiled about the plunger 90 and arranged to engage the arm 88 at one end. The opposite end of the spring 91 engages a washer 92 suitably attached to the plunger to normally hold the plunger 90 at the limit of its movement toward the roller 83. The washer 92 may be attached to the plunger 90 in any suitable manner. In the form shown a plurality of suitable transverse pin-holes are provided through the plunger 90 disposed as desired along its longitudinal axis, and a pin 93 is provided of suitable size to fit in any of these holes with a part of each end of the pin projecting to engage the washer 92, to transmit the action of the spring to the plunger, and also to engage the arm 89 of the bracket 87 to limit the outward movement of the plunger.

The bearing at the opposite end of the roller 82 preferably consists of a bracket 94 provided with an arm 95 pivotally mounted upon the bracket with a suitable shaft bearing at one end and the opposite end extended and connected to any suitable portion of the machine by a spring 96 or other suitable means arranged to normally hold the bearing upon the arm 95 advanced toward the roller 83. An arm 97 or other suitable means is preferably provided upon the bracket 94 or other convenient portion of the machine to engage the free end of the arm 95 and limit the movement above described.

Any suitable means may be provided to rotate the rollers 82 and 83. In the preferred construction the roller 83 is merely arranged to operate as an idler, free to rotate in either direction, the roller 82 however, is provided with a sprocket wheel 98 at its upper end connected by means of a sprocket chain 99 a sprocket wheel 100 and spur-gears 101 and 102 to a shaft 103. The opposite end of the shaft 103 is provided with a beveled gear 104 meshing with a suitable bevel gear 105 mounted to rotate with the sprocket wheel 72.

The various parts are suitably mounted upon the frame of my machine and may be protected from the stalks, leaves, and other material passing between the dividers and gathering reels in any desired manner. In the form shown an apron or shield 106 extends from the plate 70 down to the chain 75, and a second shield 107 extends from the chain 75 to a point directly above the gathering reels 82 on the outer side of the stalk-way. A similar arrangement is preferably provided for the inner side of the stalk-way or the side next to the rectangular portion of the frame, except that in this case an opening 108 is preferably provided in the shield 107, below the chain 75' adapted to permit the ears of corn detached by the snapping rolls to enter the lower portion or "boot" 109 of an elevator adapted to convey the detached ears from the snapping rolls to the husking rolls of my device.

In the preferred construction shown (see Fig. 3) a plurality of suitable arms or fingers 108'—108' are suitably attached to the divider plate 70 or other convenient portion of the machine and extend, preferably in a horizontal position, across the opening 108. The function of the arms 108' is to prevent broken stalks or leaves from entering the opening at the same time avoiding as far as possible interfering with the entrance of the detached ears. In the preferred construction these arms are each formed of a spring steel rod or equivalent means and are attached only at one end leaving their ends adjacent the snapping roll free to adjust itself slightly. In the preferred form a deflector or equivalent device 180 and plates 181 and 182 are provided to assist in guiding the detached ears from the snapping rolls to the boot 109.

To facilitate the removal of the ears from the stalks and also to tend to direct the detached ears toward the opening 108 a beater is provided having a reciprocating motion substantially parallel to the plane of the rolls and arranged to operate directly in front and above the snapping roll 30. This beater preferably consists of a bar 111 extending longitudinally of the snapping rolls and substantially parallel therewith, and may be attached to the machine in any desired manner. In the form shown a pair of curved arms 112—113 are provided near the opposite ends of the beater each rigidly attached thereto and adapted to extend about the roll 30 to its opposite side where they are each pivotally connected to the upright 17 of the machine. The roller 30 is positioned between the bar 111 and its pivotal supports thus providing a beater whose movement is substantially parallel to the plane of the snapping rolls and free from longitudinal movement. In operation the beater bar 111 is vibrated substantially in the plane, and transversely, of the snapping rolls and arranged to operate upon the material positioned between the snapping rolls from one side so that an ear of corn upon any of the stalks will be struck or pushed over to one side at the instant the butt of the ear is drawn against the snapping rolls. The side movement together with the pull upon the stem of the ear exerted by the snapping roll detach the ears from the stalks with a very slight tendency to shell any corn from the ears. The action of the beater as above described also tends to drive or knock the ears as detached into the opening 108 where they are received by the boot 109.

Any preferred means may be provided for operating the beater. In the form shown a spherical part 114 is rigidly attached to the beater 111 at its rear side near its center. A bell crank 115—116 is pivotally mounted upon a bracket 117 attached to the upright 17. The arm 115 of the bell crank is provided with a spherical portion 115' at its extremity. A connecting rod 118 is provided having a socket at each end adapted to engage the spherical portions 114 and 115' respectively, thus providing a flexible connection between the arm 115 of the bell crank lever 115—116 and the beater bar 111 having a ball and socket connection at each end eliminating any tendency to bind or interfere with the free movement of the parts. Any suitable means may be provided for oscillating the lever 115—116. As shown a gear 120 is mounted upon the shaft 37 and arranged to mesh with a pinion 121 upon a suitable stud attached to the beam 14. The pinion 121 is provided with a suitable opening or bearing near its periphery. A rod 119 is provided having a lateral projection at one end adapted to rotatably fit the opening in the side of the pinion 121, and at its opposite end loosely engaging the free end of the arm 116 of the bell crank, so that at each rotation of the pinion 121 the beater performs one stroke.

The usual or any preferred form of husking mechanism may be provided. As shown a plurality of pairs of the usual form of inclined husking rolls 122—122 are mounted upon the frame of my device and connected at one end by suitable gears 123—123 in the usual manner, and may be rotated by any suitable means. In the form shown a beveled gear 124 is provided upon the shaft 42 and a coöperating bevel gear 125 is provided upon one of the husking rolls for this purpose.

Any desired means may be provided to convey the ears from the ear detaching mechanism. As shown a box or trough 126 is provided extending from the boot 109 to the upper ends of the husking rolls, and sprocket wheels 127 and 128 are suitably mounted at the upper and lower ends respectively of the trough 126 with the axis of each perpendicular with, and near the center of, the bottom of the trough. A suitable sprocket chain 129, provided at intervals with blades or flights 130 is mounted upon the wheels so that the flights 130 extend toward the outer sides of the trough in position to engage an ear of corn in the boot and carry it along the trough and discharge the same upon a suitable slide or other convenient means arranged to direct them to the husking rolls. Suitable means are provided for driving the chain 129 preferably in the direction indicated. In the construction shown, the sprocket wheel 127 is mounted upon a shaft 131 extending downwardly therefrom and provided with a universal coupling or joint 132 intermediate its ends. The opposite end of the shaft 131 is provided with a sprocket wheel 133 which is connected by means of a suitable chain 134 to a sprocket wheel 135 mounted upon the end of the shaft 42.

The corn after passing over the husking rolls 122 may be disposed of in any suitable manner. In the form shown a boot 136 is provided at the lower end of the husking rolls to receive the corn as it is delivered from the rolls. This boot may be employed merely as a storage receptacle for receiving the corn and carrying it along with the machine from which it may be removed from time to time as desired. In the preferred construction shown however, this boot merely serves as the receiving portion of the conveyer or elevator adapted to continuously remove the corn therefrom and discharge the same preferably at a suitable elevation into another vehicle provided for the purpose.

The conveyer operating with the boot 136 may be of any desired form or construction. In the form shown this conveyer consists of a box or trough 137 extending from the boot 136 upward and laterally, supported by any desired number or arrangement of suitable braces or stay-rods 138—138, or other suitable means for maintaining the same in position. Sprocket wheels 140 and 141 are positioned at the upper and lower ends of the trough 137 respectively with the axes of each at substantially right angles with, and near the center of, the trough bottom. A sprocket chain 142, provided at suitable intervals with blades or flights 143, is mounted upon the sprocket wheels so that the flights 143 will extend toward the outer sides of the trough, in position to engage the ears of corn, or the like, in the boot 136 and carry it along the trough to its upper end and discharge the same at this point.

The chain 142 may be driven in any desired manner. In the preferred construction shown a beveled gear 144 is rotatably mounted with the sprocket 140 and connected by means of a suitable pinion 145 to a shaft 146 preferably provided with a universal joint or coupling 147 intermediate its ends. A sprocket wheel 148 is mounted upon the shaft 146 and connected by means of a chain 149 to a sprocket wheel 150 mounted upon the shaft 27, thus providing means for rotating the shaft 114 and operating the conveyer.

Obviously the stalks after passing the snapping rolls may be left to traverse the remaining portion of the stalkway 7 and escape therefrom without further aid from the mechanism. Where this is done however, there is usually an annoying tendency for the parts engaging the stalks to strip the leaves, or break the stalks, or drag them from the ground, the detached material often gathering in the stalk-way tending to clog the same and interfere with the operation of my machine. Also under some conditions, as when the corn is very dry, the operation of the snapping rolls tend to shell a small amount of the corn from the ears. These kernels sometimes remain entangled among the leaves and husks and sometimes fall directly from the snapping rolls to the ground, but the grain is lost in either case.

To avoid these difficulties I provide means for mechanically controlling the movement of the stalks along the stalk-way and also means along one side of the stalk-way and extending beneath the snapping rolls for receiving any loose corn shelled as above described and disposing of the same. To facilitate this operation means are preferably provided for agitating the stalks so that any loose corn entangled in the leaves will be shook free before the stalks leave the stalkway.

Any desired means may be provided to accomplish these purposes. As shown a shallow box or trough 152 is provided extending longitudinally of the stalk-way with one end positioned beneath the snapping rolls. The inner bottom of the trough 152 is provided with a series of transverse ridges or riffles 153 the face toward the rear of the machine of each of which is substantially perpendicular while the face toward the front is inclined and preferably extends to the next lower riffle. Similar ridges or teeth 154 are provided upon the outer edge of the trough adjacent the center of the stalk-way. The trough 152 extends upward and rearward along the stalk-way and its upper and rear end is preferably provided with a plurality of horizontally extending fingers 151 projecting beyond the rear of the adjacent portions of the machine so that any leaves, broken corn stalks, or other material, falling into the trough 152 will be discharged from the trough beyond the rear of the machine and free to fall to the ground, while any loose corn in the trough will fall through the fingers into a suitable receptacle or conveyer provided for that purpose. The trough 152 may be supported in any suitable manner. As shown a link 155 pivotally attached at each end is provided at each end of the trough to connect the same to the frame of the machine leaving the trough 152 free to vibrate longitudinally.

Any suitable means may be provided to vibrate the trough longitudinally. In the form shown a bar 156 is pivotally attached at one end to the trough, preferably at its bottom. The other end of the bar 156 is attached to a crank 157 upon a shaft 158 or other suitable means for moving the bar and trough longitudinally. The longitudinal vibrations of the trough causes the corn positioned therein to successively move from one of the ridges or riffles 153 to the next higher, until it reaches the upper end of the trough and is discharged, also the teeth 154 upon the sides of the trough will engage the stalks adjacent thereto and push them along the stalk-way. As the teeth move in the opposite direction they will press each stalk outward permitting it to fly back after the point of a tooth is passed, thus shaking or vibrating the stalks, effectually shaking out the corn entangled in the leaves. In the form shown, to assist in this operation a shield or deflector 159 is attached to the beam 8 and extends into the stalk-way at a suitable height above the trough 152 to engage the stalks positioned therein and force them over against the teeth 154. The upper portion of the stalks are also inclined over the trough 152 so that any corn escaping from the leaves will fall directly into the trough and be saved.

At the rear of the machine suitable means are preferably provided for engaging and forcibly ejecting the stalks from the stalk-way. In the form shown a rotatable member 162 is suitably mounted upon the beams 5 and 8 with a part extending directly across the stalk-way adapted to engage the stalks when the member is rotated and force the stalks downward out of the stalk-way. In the form shown the engaging portion of this member is substantially square but it is obvious that a roller, provided with suitable longitudinal corrugations or spikes may be provided and accomplish substantially the same results.

Any desired means may be employed for rotating the member 162. In the form shown a sprocket wheel 163 is provided at one end of the member and connected by a sprocket chain 164 to a suitable sprocket wheel 165 upon the shaft 146. In the form shown the sprocket chain 164 is also employed to rotate the shaft 158. For this purpose a sprocket wheel 166 is provided upon the extremity of the shaft 158 in position to be engaged by the sprocket chain 164 as it passes between the sprocket wheels 163 and 165.

If desired suitable means may be provided for conveying the corn discharged from the trough 152 to the boot 136 so that it may be discharged from the machine with the remainder of the corn gathered by my device. As shown a suitable trough 167 is provided for this purpose extending beneath the discharge end of the trough 152 and preferably of suitable width upon its upper side to receive any corn discharged therefrom. The opposite end of the trough 167 extends above the boot 136. Suitable sprocket wheels 168 and 169 are provided in the opposite ends of the trough 167 respectively, and a sprocket chain 170 is mounted upon the wheels 168—169 so that any corn discharged into the trough is engaged by the links of the lower strand of the chain and carried longitudinally of the trough and discharged into the boot 136.

Obviously it may often be desirable to move my device from place to place without operating the various mechanisms mounted upon the frame. In the form shown the sprocket wheels 150 and 62 are mounted upon a single sleeve, one end of which is provided with suitable jaws, or dentals, adapted to coöperate with corresponding jaws or dentals upon a part 172 splined or otherwise secured to the shaft 27 against rotation, but adapted to move longitudinally of the shaft when desired, so that the coöperating dentals may be engaged or disengaged as desired. A lever 173 or other suitable means is provided for controlling the longitudinal position of the part 172 upon the shaft, and may be connected thereto in the usual or any desired manner.

Any suitable means may be employed to move my device and guide the same from place to place or about a field when in operation. In the form shown a tongue 174 of the usual or any desired form for guiding the device and attaching horses or other draft animals is provided suitably attached to the frame and may be equipped with any preferred means for attaching the horses or other means thereto (not shown).

The operation of my device is believed to have been fully explained in the preceding specification, and no further description is deemed to be necessary.

Having thus described my improvement, it is obvious that various immaterial modifications may be made in my device without departing from the spirit of my invention, hence I do not wish to be understood as limiting myself to the exact form and construction shown.

What I claim as new, and desire to secure by Letters-Patent is:—

1. In a corn harvesting machine upwardly and rearwardly inclined corn detaching means, and a pair of dividers inclined upwardly toward, and in relation to, said detaching means and adapted to direct the stalks to said detaching means, in combination with gathering mechanism positioned below a part of said dividers and extending from the lower ends of the detaching means toward the lower ends of said dividers.

2. In a corn harvesting machine a pair of upwardly and rearwardly inclined snapping rolls and a pair of dividers inclined upwardly toward, and in relation to, said snapping rolls and adapted to direct the stalks to said snapping rolls, in combination with gathering mechanism positioned below a part of said dividers and extending from the lower ends of the snapping rolls toward the lower ends of said dividers.

3. In a corn harvesting machine a pair of upwardly and rearwardly inclined snapping rolls and a pair of dividers inclined upwardly toward, and in relation to, said snapping rolls and adapted to direct the stalks to said snapping rolls, in combination with gathering mechanism positioned below a part of said dividers and extending from the lower ends of the snapping rolls toward the lower ends of said dividers and means for operating said gathering mechanism.

4. In a corn harvesting machine, a pair of upwardly and rearwardly inclined snapping rolls and a pair of upwardly and rearwardly inclined dividers adapted to direct the stalks to said snapping rolls in combination with a pair of gathering reels positioned below a part of said dividers and extending from the lower ends of the snapping rolls toward the lower ends of said dividers at an angle to each, the face of one of said reels being smooth and of the other provided with a spiral projection.

5. In a corn harvesting machine, a pair of upwardly and rearwardly inclined snapping rolls and a pair of upwardly and rearwardly inclined dividers adapted to direct the stalks to said snapping rolls, in combination with a pair of rotatable gathering reels each tapering at its forward end, and positioned below a part of said dividers and extending from the lower ends of the snapping rolls toward the lower ends of said dividers at an angle to each.

6. In a corn harvesting machine, a pair of upwardly and rearwardly inclined snapping rolls and a pair of upwardly and rearwardly inclined dividers converging toward, and adapted to direct the stalks to said snapping rolls, in combination with a pair of rotatable gathering reels extending from the lower ends of the snapping rolls toward the lower ends of the dividers at an angle to each and the bearings for one of said gathering reels being independently movable laterally thereby permitting lateral movement of the reel.

7. In a corn harvesting machine, a pair of upwardly and rearwardly inclined snapping rolls and a pair of upwardly and rearwardly inclined dividers converging toward and adapted to direct the stalks to said snapping rolls, in combination with a pair of rotatable gathering reels extending from the lower ends of the snapping rolls toward the lower ends of the dividers at an angle to each and a bearing for one of said gathering reels being independently movable laterally thereby permitting lateral movement of the reel, and resilient means tending to control the position of the bearing.

8. In a corn harvesting machine, a pair of upwardly and rearwardly inclined snapping rolls and a pair of upwardly and rearwardly inclined dividers adapted to direct the stalks to said snapping rolls, in combination with a pair of rotatable gathering reels extending from the lower ends of the snapping rolls toward the lower ends of said dividers, the bearings at each end of one of said reels being independently movable laterally thereby permitting lateral movement of the reel.

9. In a corn harvesting machine, a pair of upwardly and rearwardly inclined snapping rolls and a pair of upwardly and rearwardly inclined dividers adapted to direct the stalks to said snapping rolls, in combination with a pair of rotatable gathering reels positioned below a part of said dividers and extending from the lower ends of the snapping rolls toward the lower ends of said dividers, the bearing at each end of one of said gathering reels being independently movable laterally thereby permitting lateral movement of the reel, and resilient means tending to control the position of said bearings.

10. In a corn harvesting machine, a pair of upwardly and rearwardly inclined snapping rolls and a pair of upwardly and rearwardly inclined dividers converging toward, and adapted to direct the stalks to said snapping rolls, in combination with a pair of cylindrical rotatable gathering reels positioned below a part of said dividers and extending from the lower ends of the snapping rolls toward the lower ends of the dividers, and means for rotating one of said gathering reels.

11. In a corn harvesting machine, a pair of upwardly and rearwardly inclined snapping rolls and a pair of upwardly and rearwardly inclined dividers adapted to direct the stalks to said snapping rolls, in combination with a pair of cylindrical rotatable gathering reels positioned below a part of said dividers and extending from the lower ends of the snapping rolls toward the lower ends of said dividers, the surface of one of said reels being smooth and the other provided with a spiral projection, and means for rotating one of said gathering reels.

12. In a corn harvesting machine, a pair of upwardly and rearwardly inclined snapping rolls and a pair of upwardly and rearwardly inclined dividers adapted to direct the stalks to said snapping rolls, in combination with a pair of cylindrical rotatable gathering reels each tapering at its forward end, the surface of one of said reels being smooth and the other provided with a spiral projection, said gathering reels being positioned below a part of said dividers and extending from the lower ends of the snapping rolls toward the lower ends of the dividers, and means for rotating one of said gathering reels.

13. In a corn harvesting machine, a pair of upwardly and rearwardly inclined snapping rolls and a pair of upwardly and rearwardly inclined dividers adapted to direct the stalks to said snapping rolls, in combination with a pair of cylindrical rotatable gathering reels each tapering at its forward end the surface of one of said reels being smooth and the other provided with a spiral projection, said reels being positioned below a part of said dividers and extending from the lower ends of the snapping rolls toward the lower ends of said dividers, the bearings for one of said reels being movable laterally thereby permitting lateral movement of the reel, and means for rotating one of said reels.

14. In a corn harvesting machine, a pair of upwardly and rearwardly inclined snapping rolls and a pair of upwardly and rearwardly inclined dividers adapted to direct the stalks to said snapping rolls, in combination with a pair of rotatable gathering reels the surface of one of which is smooth and of the other provided with a spiral projection, said reels being positioned below a part of the dividers and extending from the lower ends of the snapping rolls toward the lower ends of said dividers, a bearing for one of said reels being movable laterally thereby permitting lateral movement of the reel, and resilient means tending to control the position of said bearing.

15. In a corn harvesting machine, a pair of upwardly and rearwardly inclined snapping rolls and a pair of upwardly and rearwardly inclined dividers adapted to direct the stalks to said snapping rolls, in combination with a pair of rotatable gathering reels the surface of one of which is smooth and the other provided with a spiral projection, said gathering reels being positioned below a part of said dividers and extending from the lower ends of the snapping rolls toward the lower ends of said dividers, the bearings at each end of one of said gathering reels being movable laterally thereby permitting lateral movement of the reel.

16. In a corn harvesting machine, a pair of upwardly and rearwardly inclined snapping rolls and a pair of upwardly and rearwardly inclined dividers adapted to direct the stalks to said snapping rolls, in combination with a pair of cylindrical rotatable gathering reels the surface of one of which is smooth and of the other provided with a spiral projection said gathering reels being positioned below a part of said dividers and extending from the lower ends of the snapping rolls toward the lower ends of the dividers, a bearing for one of said gathering reels being movable laterally thereby permitting lateral movement of the reel, and means for limiting the movement of said bearing.

17. In a corn harvesting machine, a pair of rotatable coöperating snapping rolls one of which is provided with a plurality of projections upon its face, and the other with a plurality of recesses the width of each substantially equaling its length arranged to coöperate with the periphery of said projections to engage an ear stem between the rolls.

18. In a corn harvesting machine, a pair of rotatable snapping rolls one of which is provided with a plurality of spiral projections upon its face, and the other with a plurality of recesses the width of each substantially equaling its length arranged to coöperate with the periphery of said projections to engage an ear-stem between the rolls.

19. In a corn harvesting machine, a pair of coöperating rotatable snapping rolls one of which is provided with a plurality of spiral projections upon its face, and the other with a plurality of spirally arranged recesses the width of each substantially equaling its length and arranged to coöperate with the periphery of said projections to engage an ear-stem between the rolls.

20. In a corn harvesting machine, a pair of rotatable rolls each provided with a bearing in one end, a non-rotatable shaft adapted to coöperate with said bearing to rotatably support the end of said roll in position, an arm rigidly attached to said shaft extending laterally and thence toward the opposite end thereof, means engaging said arm for directing the movement of one end of said shaft, and means attached to said arm opposite said bearings to control the transverse position of said shaft.

21. In a corn harvesting machine, a pair of rotatable rolls each provided with a bearing in one end, a non-rotatable shaft adapted to coöperate with said bearing to rotatably support the end of said roll in position, an arm rigidly attached to said shaft extending toward the opposite end thereof, means engaging said arm for directing the movement of one end of said shaft, and means attached to said arm opposite said bearing to control the transverse position of said shaft.

22. In a corn harvesting machine, a pair of rotatable rolls each provided with a bearing at one end, a non-rotatable shaft adapted to coöperate with said bearing to rotatably support the end of said roll in position, an arm rigidly attached to said shaft extending toward the opposite end thereof, means engaging said arm for directing the movement of said shaft, and means attached to said arm opposite said bearing for rigidly controlling the transverse position of the shaft in one direction, and resilient means for controlling its position in the opposite direction.

23. In a corn harvesting machine, a pair of rotatable rolls each provided with a bearing in one end, a non-rotatable shaft adapted to coöperate with said bearing to rotatably support the end of said roll in position, a non-rotatable shaft and an arm rigidly attached to said shaft and extending toward the opposite end thereof, means engaging said arm for directing the movements of one end of the shaft, and adjustable means attached to the arm opposite said bearing for rigidly controlling the transverse position of the shaft in one direction and resiliently controlling its position in the opposite direction.

24. In a corn harvesting machine, a pair of rotatable rolls one of which is provided with a plurality of projections upon its face and the other with a plurality of recesses the width of each substantially equaling its length arranged to coöperate with the peripheries of said projections to engage a stalk between the rolls, and each provided with a bearing in one end, a non-rotatable shaft adapted to coöperate with said bearing to rotatably support the ends of the rolls in position.

25. In a corn harvesting machine, a pair of rotatable rolls each provided with a bearing in one end, an adjustably mounted non-rotatable shaft adapted to coöperate with said bearing to rotatably support the end of said roll in position, an arm rigidly attached to one end of said shaft extending toward the opposite end thereof, means engaging said arm for directing the movement of said shaft, and means attached to said arm opposite said bearings to control the transverse position of said shaft.

26. In a corn harvesting machine, a pair of rotatable rolls each provided with a bearing in one end, an adjustably mounted non-rotatable shaft adapted to coöperate with said bearing to rotatably support the end of the roll in position, an arm rigidly attached to said shaft extending toward the opposite end thereof, means engaging said arm for directing the movements of one end of said shaft, and adjustable means attached to said arm opposite said bearing for rigidly controlling the transverse position of the shaft in one direction and resiliently controlling its position in the opposite direction.

27. In a corn harvesting machine, a pair of rotatable snapping rolls one of which is provided with a plurality of projections upon its face and the other with a plurality of recesses arranged to coöperate with the peripheries of said projections to engage a stalk between the rolls, each of said rolls being provided with a bearing in one end, an adjustably mounted non-rotatable shaft adapted to coöperate with said bearing to rotatably support the end of said roll in position, and an arm rigidly attached to said shaft and extending toward the opposite end thereof, and means attached to said arm opposite said bearing to control the transverse position of said shaft.

28. In a corn harvesting machine, a pair of rotatable snapping rolls adapted to coöperate to remove the ears from the stalks, in combination with a beater adapted to operate upon the corn engaged by said rolls, said beater being mounted at one side of said rolls and arranged to operate at the opposite side.

29. In a corn harvesting machine, a pair of rotatable snapping rolls adapted to coöperate to remove the ears from the stalks, in combination with a beater positioned substantially parallel to the rolls and adapted to operate upon the corn engaged by said rolls, said beater being mounted at one side of one of said rolls and arranged to operate at the opposite side.

30. In a corn harvesting machine, a pair of rotatable snapping rolls adapted to coöperate to remove the ears from the stalks, in combination with a beater adapted to operate upon the corn engaged by said rolls, said beater being pivotally mounted at one side of one of said rolls and arranged to operate at the opposite side.

31. In a corn harvesting machine, corn detaching means adapted to remove the ears from the stalks, in combination with a beater positioned substantially parallel to said detaching means adapted to operate at the front side thereof, said beater being pivotally mounted at one side of said detaching means and arranged to operate at the opposite side.

32. In a corn harvesting machine, a pair of rotatable snapping rolls each adapted to coöperate to remove the ears from the stalks, in combination with a beater positioned substantially parallel to the rolls and adapted to operate upon the corn engaged by said rolls, said beater being provided with a plurality of arms each rigidly attached to the beater at one end and extending about one of the rolls and pivotally attached to the machine at the opposite side of said roll.

33. In a corn harvesting machine, means adapted to detach the ears from the stalks, and mechanism for conveying the detached ears from said detaching means, in combination with separate conveying mechanism adapted to receive and remove any loose kernels shelled during the detaching operation, a stalk deflector, and means upon said separate conveying mechanism adapted to coöperate with said deflector for agitating said stalks and partially controlling their movement relative to the machine.

34. In a corn harvesting machine, means adapted to detach the ears from the stalks, and mechanism for conveying the detached ears from said detaching means, in combination with separate conveying mechanism adapted to receive and remove any loose kernels shelled during the detaching operation, and means upon said separate conveying mechanism for agitating said stalks and partially controlling their movement relative to the machine.

35. In a corn harvesting machine, means adapted to detach the ears from the stalks, in combination with a reciprocating member positioned below said detaching means adapted to receive and remove any loose kernels shelled during the detaching operation, and means upon said reciprocating member for agitating said stalks and partially controlling their movement relative to the machine.

36. In a corn harvesting machine, means adapted to detach the ears from the stalks, and a reciprocating conveyer positioned below said detaching means adapted to receive and remove any loose kernels shelled during the detaching operation, in combination with a stalk deflector and means upon said reciprocating member adapted to coöperate with said deflector to agitate said stalks and partially control their movement relative to the machine.

37. In a corn harvesting machine, means adapted to detach the ears from the stalks, and mechanism for conveying the detached ears from said detaching means, in combination with a reciprocating conveyer positioned below said detaching means adapted to receive and remove any loose kernels shelled during the detaching operation, and means upon said reciprocating member for agitating said stalks and partially controlling their movement relative to the machine.

38. In a corn harvesting machine, means adapted to detach the ears from the stalks, and mechanism for conveying the detached ears from said detaching means, in combination with a reciprocating member extending longitudinally of the stalk-way with one end positioned beneath said detaching means adapted to receive and remove any loose kernels shelled during the detaching operation, and means upon said reciprocating member for agitating the stalks and partially controlling their movement relative to the machine.

39. In a corn harvesting machine, means adapted to detach the ears from the stalks, and mechanism for conveying the detached ears from said detaching means, in combination with a reciprocating member extending longitudinally of the stalk-way with one end positioned beneath said detaching means adapted to receive and remove any loose kernels shelled during the detaching operation, mechanism for separating the refuse material from the corn and means upon said reciprocating member extending laterally therefrom for agitating said stalks and partially controlling their movement relative to the machine.

40. In a corn harvesting machine, means adapted to detach the ears from the stalks, and mechanism for conveying the detached ears from said detaching means, in combination with a reciprocating member extending longitudinally of the stalk-way with one end positioned beneath said detaching means adapted to receive and remove any loose kernels shelled during the detaching operation, a stalk deflector, and means adapted to coöperate with said deflector for agitating said stalks and partially controlling their movement relative to the machine.

41. In a corn harvesting machine, means adapted to detach the ears from the stalks, and mechanism for conveying the detached ears from said detaching means, in combination with a reciprocating member extending longitudinally of the stalk-way with one end positioned beneath said detaching means adapted to receive and remove any loose kernels shelled during the detaching operation, a stalk deflector, and means extending laterally from said reciprocating member adapted to coöperate with said deflector for agitating said stalks and partially controlling their movement relative to the machine.

42. In a corn harvesting machine, a substantially open stalk-way extending to the rear of the machine, and a rotatable member positioned with its axis extending across said stalk-way provided with means adapted to engage the stalks and forcibly eject the same from said stalk-way and means for rotating said member.

43. In a corn harvesting machine, a main frame provided with a substantially open stalk-way therethrough extending to the rear of the machine, a reciprocating member extending longitudinally of said stalk-way and provided with means adapted to engage the stalks and partially control their position in the stalk-way, and means extending into said stalk-way adapted to engage the stalks and forcibly eject the same from said stalk-way.

44. In a corn harvesting machine, a main frame provided with a substantially open stalk-way therethrough extending to the rear of the machine, a stalk deflector and a reciprocating member extending longitudinally of said stalk-way and provided with means adapted to coöperate with said deflector to engage the stalks and partially control their movement, and means adapted to engage the stalks and forcibly eject the same from said stalk-way.

45. In a corn harvesting machine, a main frame provided with a substantially open stalk-way therethrough extending to the rear of the machine, a reciprocating member extending longitudinally of said stalk-way and provided with means to engage the stalks and partially control their position, a rotatable member extending across said stalk-way provided with means adapted to engage the stalks and forcibly eject the same from said stalk-way, and means for operating said members.

46. In a corn harvesting machine, a main frame provided with a substantially open stalk-way therethrough extending to the rear of the machine, a stalk deflector and a reciprocating member extending longitudinally of said stalk-way and provided with means adapted to coöperate with said deflector to engage the stalks and partially control their movement, and a rotatable member extending across said stalk-way provided with means adapted to engage the stalks and forcibly eject the same from said stalk-way and means for operating said members.

47. In a corn harvesting machine, a supporting frame arranged to form an inclosure, a stalk-way at one side of said inclosure formed by two slightly divergent bars connected at their contiguous ends, means for controlling the position of, and distance between the free ends of said bars, comprising a transverse member spaced from said bars and positioned intermediate their ends and rigidly connected thereto, an upright for each bar rigidly connecting the bar to said transverse member, and bracing means for rigidly holding the several parts in position.

48. In a corn harvesting machine a supporting frame arranged to form an inclosure, a stalk-way at one side of said inclosure formed by two bars connected at one end, means for supporting the free end of the outer bar and bracing means at the connected ends of said bars and engaging said bars intermediate their ends for rigidly maintaining the relative positions of said bars.

In testimony whereof, I have hereunto signed my name in the presence of two subscribing witnesses.

CHARLES H. TAYLOR.

Witnesses:
BENTON U. HILLS,
CHARLES I. COBB.